Oct. 11, 1932.  E. R. MEYER  1,881,817
FREEZING MOLD
Filed Aug. 14, 1931
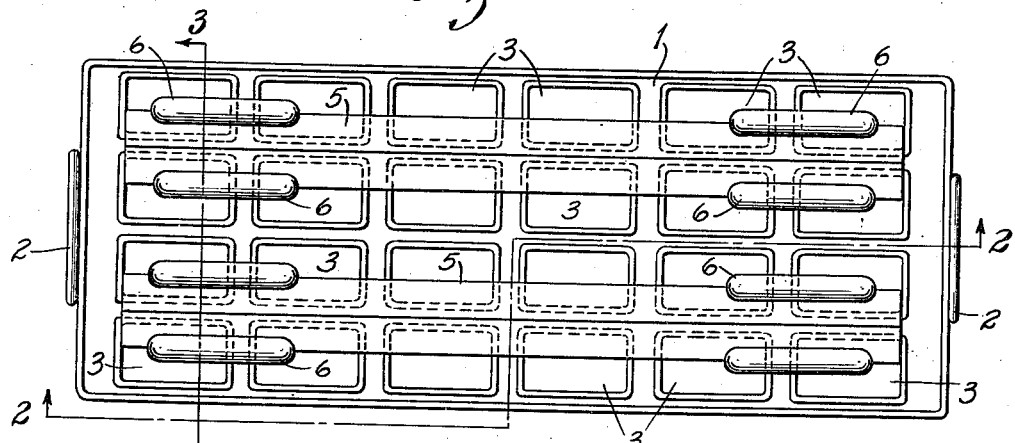
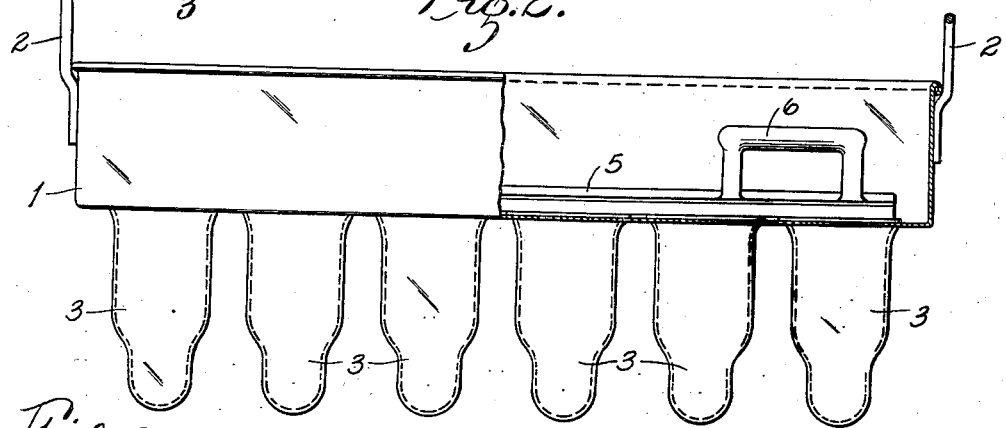
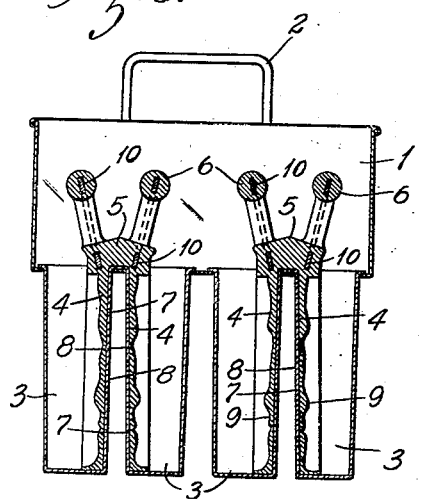
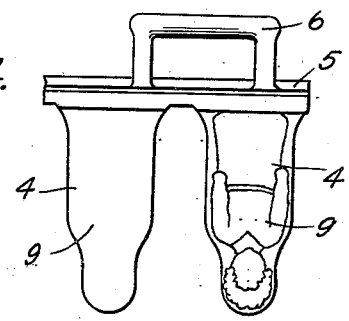
INVENTOR:
Edwin R. Meyer
by Cau Han Granly
HIS ATTORNEYS.

Patented Oct. 11, 1932

1,881,817

UNITED STATES PATENT OFFICE

EDWIN R. MEYER, OF ST. LOUIS, MISSOURI, ASSIGNOR TO MEYER-BLANKE COMPANY, OF ST. LOUIS, MISSOURI, A CORPORATION OF MISSOURI

FREEZING MOLD

Application filed August 14, 1931. Serial No. 557,029.

My invention relates to molds particularly molds for freezing edible substances. The invention has for its principal object a mold that permits easy removal of the frozen articles and facilitates the shaping of one of the surfaces of the article in relief. The invention further consists in the freezing mold and in the parts and combinations, and arrangements of parts hereinafter described and claimed.

In the accompanying drawing.

Fig. 1 is a top plan view of a freezing mold embodying my invention.

Fig. 2 is a part elevation, part sectional view on the line 2—2 in Fig. 1.

Fig. 3 is a sectional view on the line 3—3 in Fig. 1, and

Fig. 4 is a detail side elevation of a portion of the removable panel member.

In the drawing is illustrated a freezing mold adapted to freeze edible substances. It comprises a pan or tray member 1 provided with lifting handles 2 and having in its bottom, downwardly projecting mold compartments 3 in which the edible substance is frozen. A removable panel 4 is provided for one side wall of each mold compartment. Preferably, a plurality of pairs of these panels 4 are mounted on a common mounting strip 5 that is provided with lifting handles 6. Thus a large number of these panels 4 can be inserted in and removed from the freezing compartments 3 simultaneously. The back or inner face 7 of each panel fits against one wall 8 of a compartment and the front 9 of each panel is of varying configuration so as to produce on one surface of the frozen article some ornamental design in relief. In the particular form illustrated the face of the frozen article will have the appearance of a little girl.

The panels may be made of rubber or other suitable material and preferably the mounting strip 5 and the handles 6 will be provided with metal or other reinforcing members 10.

This construction makes it possible to remove the frozen articles from the mold compartments without destroying the configuration of the face of each frozen article. Likewise, it facilitates the operation of changing the configuration of the frozen articles since the main mold member may be used for articles having any desired configuration, the only change that is required being the substitution of different panel members. Likewise the panel members greatly facilitate the operation of removing the frozen articles from the mold compartments.

What I claim is:

1. A freezing mold construction comprising a plurality of pairs of mold compartments, removable rubber panels engaging adjacent faces of the pairs of compartments, the surfaces of said panels in contact with the frozen article having a design therein and a rubber mounting strip to which all of said panels are secured.

2. A freezing mold construction comprising a plurality of pairs of mold compartments, removable rubber panels engaging adjacent faces of the parts of compartments, the surfaces of said panels in contact with the frozen article having a design therein, a rubber mounting strip to which all of said panels are secured, rubber handles for said mounting strip and metal reinforcement for said mounting strip and said handles.

Signed at St. Louis, Missouri, this 11th day of August, 1931.

EDWIN R. MEYER.